Dec. 24, 1957 P. O. ESMAY 2,817,189
WEED-KILLING SPRAY CANE
Filed Feb. 23, 1955 2 Sheets-Sheet 1
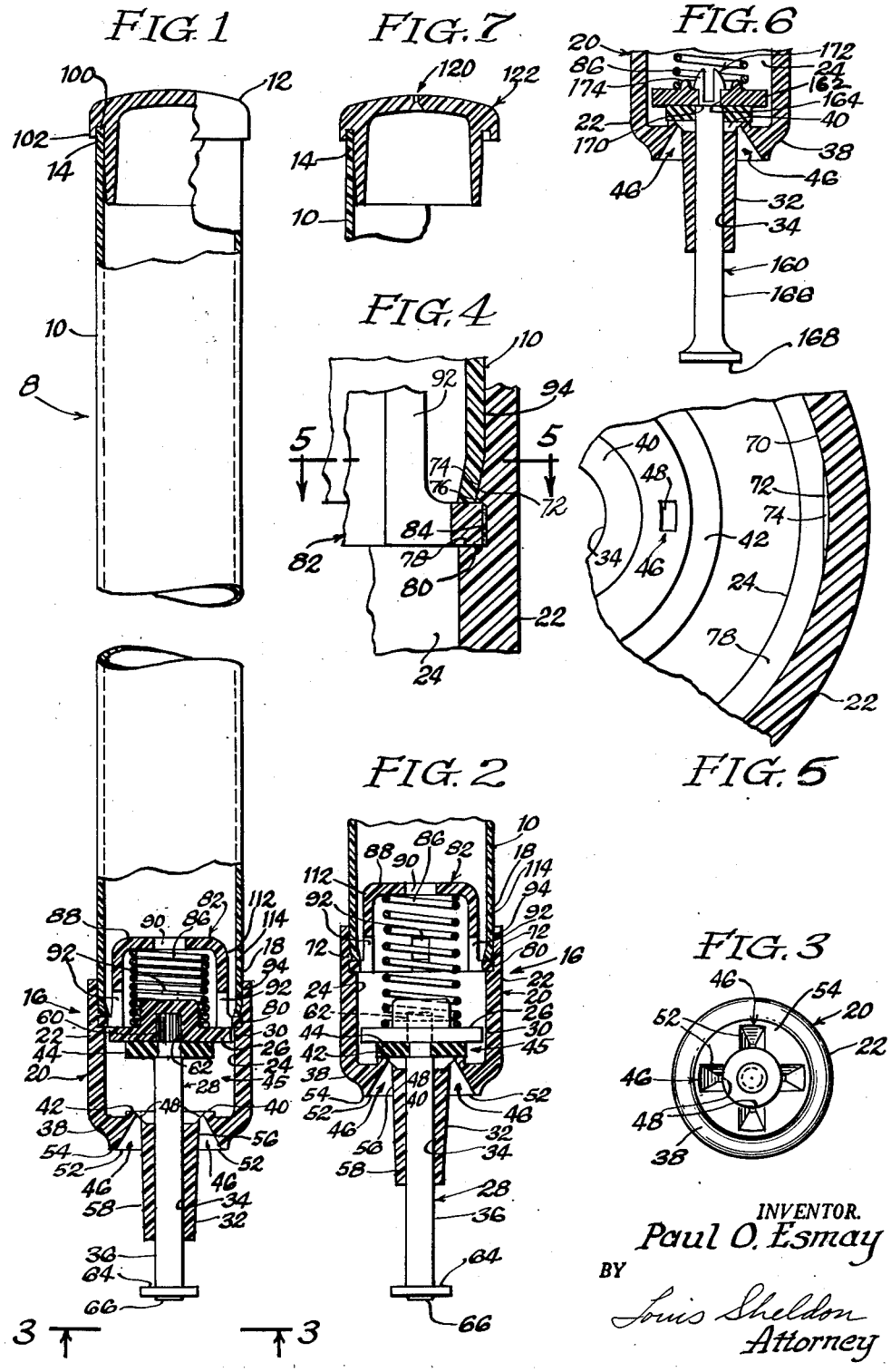
INVENTOR.
Paul O. Esmay
BY
Louis Sheldon
Attorney

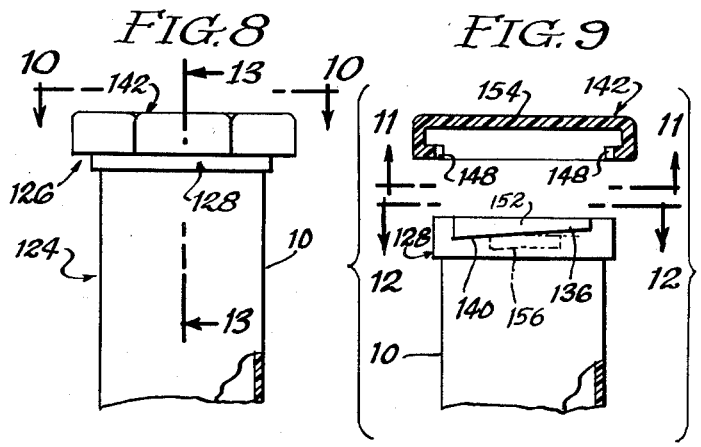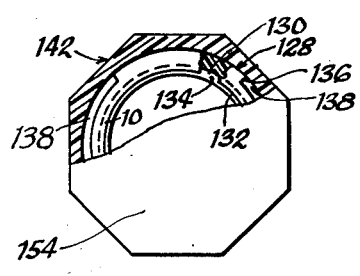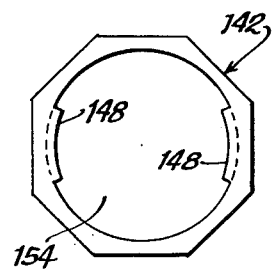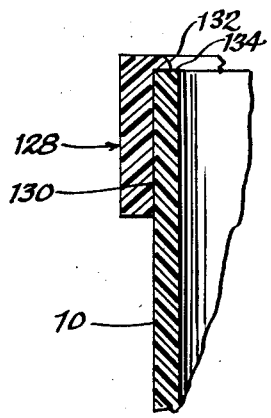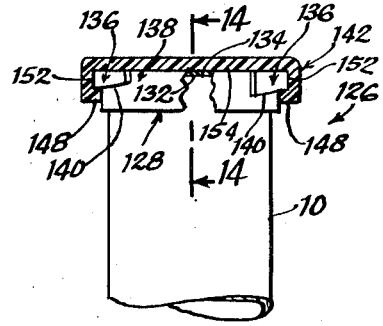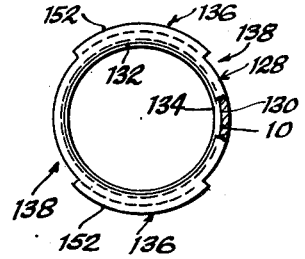

United States Patent Office 2,817,189
Patented Dec. 24, 1957

2,817,189

WEED-KILLING SPRAY CANE

Paul O. Esmay, Three Rivers, Mich.

Application February 23, 1955, Serial No. 489,931

15 Claims. (Cl. 47—1)

This invention relates to sprayers, and is concerned more particularly with devices for treating plants and other purposes.

An object of the invention is to provide a weed killing spray cane of simplified construction.

A further object is to provide a portable plant treating dispenser operative to discharge a stream in the form of a spray.

Another object is to provide an improved plant treating spray device which may be readily carried about by any person and used where needed.

Further objects and advantages of the invention will appear as the description proceeds.

The invention will be better understood upon reference to the following description and the accompanying drawings, in which:

Fig. 1 is a longitudinal view, partly in section and partly in elevation, showing one form of the invention with the parts arranged pursuant to compression of the spring, ready to commence discharge.

Fig. 2 is similar to the lower part of Fig. 1 but with the spring expanded and holding the valve closed.

Fig. 3 is a bottom plan view taken as indicated by the line 3—3 in Fig. 1.

Fig. 4 is an enlarged fragmentary sectional view showing details of a portion of Fig. 1.

Fig. 5 is a sectional view taken as indicated by the line 5—5 in Fig. 4, but showing the outermost part by itself.

Fig. 6 is similar to the lower part of Fig. 1 but shows a modified piston.

Fig. 7 is similar to the upper part of Fig. 1 but shows a vented cap.

Fig. 8 is an elevational view of the upper part of a modified cane.

Fig. 9 is an exploded view showing the cap of Fig. 8 in cross section and the cooperating structure in elevation.

Fig. 10 is a top plan view, partly in section, taken as indicated by the line 10—10 in Fig. 8.

Fig. 11 is a bottom plan view taken as indicated by the line 11—11 in Fig. 9.

Fig. 12 is a top plan view taken as indicated by the line 12—12 in Fig. 9.

Fig. 13 is a sectional view taken as indicated by the line 13—13 in Fig. 8.

Fig. 14 is a sectional view taken as indicated by the line 14—14 in Fig. 13.

Referring now more particularly to the drawings, disclosing illustrative embodiments of the invention, there is shown at 8 a weed treating spray cane comprising a transparent substantially rigid tube 10 extending throughout the major portion of the length of the cane, a cap 12 for the top 14 of the tube, and spray mechanism 16 at the bottom 18 of the tube.

The spray mechanism 16 comprises a body 20 having an upper preferably enlarged portion 22 open at the top and formed with a cylinder bore 24 in which the head 26 of a piston 28 is reciprocable with slight clearance 30, a neck or stem 32 having a bore 34 in which the substantially longer rod 36 of the piston is slidably reciprocable, and a connecting shoulder 38. The shoulder 38 has a crater 40 at the upper end of the neck bore 34, and an annular valve seat 42 at the top of the crater and spaced from the wall of the cylinder bore 24, for engagement with a soft rubber or other suitable valve washer or collar 44 preferably in sealed engagement with and about the piston rod 36, providing a valve 45. The shoulder 38 is formed with downwardly flaring discharge ports 46 whose upper ends 48 are at the crater wall and whose lower ends 52 are at the bottom surface 54 of the shoulder, the radially innermost portion 56 of each port being substantially a continuation of the outer surface 58 of the neck 32. The top 60 of the rod 36 may be knurled or otherwise formed and driven into a hole 62 in the piston head 26 to securely join them together, and a foot 64 is peened as at 66 or otherwise securely fixed to the bottom of the rod.

The body portion 22 has a counterbore 70 above the cylinder bore 24 and interrupted by four equally spaced or other suitable number and arrangement of detents 72, each detent having an inwardly and downwardly slightly inclined upper face 74 and an outwardly and downwardly relatively abruptly inclined lower face 76 spaced from and facing a ledge 78 between the bore and the counterbore. The rim flange 80 of an inverted cup 82 is trapped between the detents 72 and the ledge 78, and is preferably cemented in pace as at 84, confining under compression a spring 86 between the piston head 26 and the cup base 88. The cup 82 is formed with a base hole 90 and preferably with one or more holes 92 adjacent its rim, for purposes hereinafter set forth. The material of the body 20 and/or cup 82 is of a suitable plastic or other substance which will resiliently yield sufficiently to enable the cup flange 80 to be snapped past the detents 72 manually or otherwise with a single quick motion, to complete the assembly of the spray mechanism 16.

An end 18 of the tube 10 is then telescoped into the counterbore 70 and there cemented as at 94, the tube preferably being of plastic and being temporarily softened by the cement so as to bulge inward and flow under the detents 74 and onto the flange 80 substantially as indicated at 96, and may adhere to the flange circumferentially, and then hardens.

The cap 12 is preferably completely removable, and may be applied and removed manually, and is formed with a downwardly open annular groove 100 formed to frictionally receive the upper end 14 of the tube 10. The cap lip 102 embracing the tube may be pulled at one side by the fingers to facilitate working the cap 12 up off the tube 10.

With the cap 12 removed, the user pours a suitable weed-killing liquid, for example a solution of 2,4-D and water, into the cane 8, the perforated cup 82 allowing the solution to fill the cup and the cylinder bore 24. When the cane 8 is not in operation, the spring 86 holds the washer 44 in firm engagement with the valve seat 42 (Fig. 2), and the piston head 26 in firm engagement with the washer, so that no liquid can leak down out of the ports 46 or the neck bore 34. To kill a weed, the user places the cane foot 64 on or adjacent the center of the weed, and, with the cane substantially vertical, presses down on the cap 12 with sufficient force to compress the spring 86, only a few pounds of pressure being required to fully compress the spring, so that this can be accomplished in one quick motion. The piston head clearance at 30 provides a passage for the flow of the liquid as the body 20 descends while the piston 28 remains stationary, and in this descent the valve seat 42 is separated from the washer 44 (Fig. 1) so that the valve 45 is opened, allowing the liquid to enter the discharge ports 46. No sooner is the spring 86 compressed than the pressure is removed, so that the spring, in expanding, immediately pumps the liquid below the piston head 26 and washer 44 through the ports 46 until the valve 45 is closed, the clearance 30 being sufficiently small that little or none of the liquid during the discharge stroke rises therethrough. The radius of the foot 64 is preferably substantially equal to the radius of the inner portion of the wall of each port 46, so that the inner part of the spray will impinge on the weed in proximity to the foot. The spray resulting from the use of the flared parts 46 takes a somewhat simulated cloverleaf form, and in a commercial embodiment of the invention the spray pattern has a spread of about four or five inches on the ground or weed.

The shoulder surface 54 meets the ports 46 in preferably sharp corner edges which have the effect of inhibiting the tendency of some of the liquid to desert its stream and adhere to and flow outward or collect and gravitate in drops from said surface.

The cup wall 112 is preferably of substantially less diameter than the interior of the tube 10 to easily clear the same, as indicated at 114, so that they may readily be assembled, no tight fit being necessary. The cup holes 92 insure using up of all the liquid in the clearance space 114, and may also serve to allow adequate flow from the tube to enable the cane 8 to operate properly in rapid succession, the cup hole 90 helping in this respect and reducing the amount of material and thus the cost of the cup.

The cap may be formed with a vent 120 as in the modification shown at 122 in Fig. 7, but I prefer an unvented cap of which one form is shown at 12, which affords an air seal as well as a liquid seal. When the cane 8 is full of liquid except for a small space at the top, the cap 12 as it is applied substantially compresses the trapped air, which, upon release of the capping force, pops the cap off. However, the cap 12 may be readily applied and will stay put if, concurrently with its application, the cane is operated. Such operation allows air to enter through the ports 46, such air rising through the entire head of liquid to the top, thereby so lowering the pressure of the trapped air that such air does not exert sufficient if any pressure to remove the cap.

The cap 12 may be readily shoved into and will remain in place without necessitating operation of the cane if, at the time of application of the cap, the tube is substantially less than full, because the resulting increase in pressure of the trapped air is too small to overcome the friction by which the cap is held in place.

When the cane 8 is operated, all of the air entering the cane to displace the liquid discharged enters through the ports 46, and this air bubbles up throughout the entire column of solution and thus vigorously keeps the solution well mixed. This is particularly important where the active ingredient of the solution tends to settle or collect so that incomplete agitation results in too concentrated or too weak a spray.

A modified cane 124 (Figs. 8 to 14) embodies a different capping structure, indicated generally at 126, which includes a preferably rigid collar 128 cemented at 130 to the upper exterior of the tube 10, said collar having at the top thereof a narrow inwardly projecting flange 132 resting on the top edge 134 of the tube, and also having outwardly extending wedge projections 136 spaced apart to afford bayonet passages 138, the under sides 140 of said projections being inclined relative to the plane of said flange. The cap 142 is preferably polygonal to facilitate its rotation, and has spaced inwardly directed lugs 148 of a peripheral extent less than that of the passages 138 so as to be readily movable up and down therethrough. The cap wall 150 is arranged so as to be capable of movement alongside the outer surface 152 of the projections 136, and the lugs 148 are adapted to grip the wedge surfaces 140 of the projections to firmly clamp the underside of the collar 128 and thus seal the upper end of the cane against air and liquid. The cap 142 and/or the collar 128 may be of sufficient resilience to enhance the bayonet hold, and the lugs 148 may be somewhat resiliently flexed in the gripping position, as shown in dot-dash lines at 156 in Fig. 9. With this construction the cap 142 may be applied to and will stay put on the tube and afford a dependable air and liquid seal without requiring operation of the cane while the cane is full of solution.

A modified piston is shown at 160 (Fig. 6), and comprises a head 162 having a hole 164 therethrough, and a rod 166 having a foot 168 and formed near its other end with a neck 170 between two shoulders, and terminating in a nose 172, said other end having a longitudinal end slot dividing the nose and at least a substantial part of the neck, so that the resulting prongs are resiliently flexible toward and away from each other. This structure enables the head 162 and rod 166 to be firmly interlocked by a single telescoping snap action, with the shoulders gripping the head at the ends of the hole 164. The head 162 preferably has a top annular lip 174 to position the lower end of the spring 86. The rod 166 may be molded in one piece.

The tube, spray mechanism body, piston head, inverted cup, and capping collar may be molded of a plastic such as that known in the trade as "Tenite 2" (which may be a trademark), the caps may be molded of a plastic such as polyethylene, the first described piston rod may be of metal such as brass, and the second described piston rod molded of nylon, although other suitable materials may be found satisfactory.

With a cane constructed in accordance with the invention, using four discharge ports, approximately fourteen discharges (56 streams) have been realized per cubic inch of solution. Such a cane when of an overall height of about 33" requires no stooping for its operation, and hundreds of discharges per filling may be obtained.

Various changes may be made and modifications resorted to without departing from the spirit of the invention. Hence I do not wish to be restricted to the forms of the invention illustrated and described or the uses mentioned except to the extent indicated in the appended claims, which are to be interpreted as broadly as the state of the art will permit.

I claim:

1. A weed spraying cane comprising a tube, a tubular spray body for the bottom of said tube, a piston guided in said body and having a foot below said body and a head within said body, said body having one or more discharge ports controlled by said piston, said body having an internal annular upwardly facing ledge and an internal wall adapted to telescopically embrace said tube and extending from the outer periphery of said ledge, and integral detents over said ledge and spaced uniformly from said ledge and the top of said wall, said ledge projecting inward substantially farther than said detents, a perforated spring retainer over said head, said body and retainer being relatively resiliently yieldable, said retainer having a rim telescoped down in said wall and snapped past said detents and securely trapped between said ledge and said detents, and a spring under compression between said retainer and said head, the bottom of said tube being hermetically sealed to said wall.

2. A weed spraying cane comprising a tube, a tubular spray body for the bottom of said tube, a piston guided in said body and having a foot below said body and a head within said body, said body having one or more discharge ports controlled by said piston, said body having an internal annular upwardly facing ledge and an internal wall adapted to telescopically embrace said tube and extending from the outer periphery of said ledge, and integral detents over said ledge and spaced uniformly from said ledge and the top of said wall, a perforated spring retainer over said head, said body and retainer being relatively resiliently yieldable, said retainer having a rim telescoped down in said wall and snapped past said detents and securely trapped between said ledge and said detents, and a spring under compression between said retainer and said head, the bottom of said tube being hermetically sealed to said wall.

3. A weed spraying cane comprising a tubular spray body, a piston guided in said body and having a foot below said body and a head within said body, said body having one or more discharge ports controlled by said piston, said body having an internal annular upwardly facing ledge and an internal wall extending from the outer periphery of said ledge, and integral detents over said ledge and spaced uniformly from said ledge, a perforated spring retainer over said head, said body and retainer being relatively resiliently yieldable, said retainer having a rim telescoped down in said wall and snapped past said detents and securely trapped between said ledge and said detents, and a spring under compression between said retainer and said head.

4. In a weed spraying cane, a tubular body for the discharge end of the cane, said body having a substantially annular internal ledge and relatively minute integral substantially identical wedge-shaped detents between and spaced from said ledge and the end of said body toward which said ledge faces, said detents overhanging and being uniformly spaced from said ledge, each detent being arranged with its wedge surfaces respectively facing said ledge and end, the end-facing surface of each detent having a relatively gentle slope, whereby a resiliently yieldable spring retainer having a rim of a size to rest on said ledge and between said ledge and said detents may be inserted at said end and readily snapped past said detents and retained between said ledge and said detents.

5. In a weed spraying cane, a tubular body for the discharge end of the cane, said body having a substantially annular internal ledge and relatively minute integral substantially identical wedge-shaped detents between and spaced from said ledge and the end of said body toward which said ledge faces, said detents overhanging and being uniformly spaced from said ledge, each detent being arranged with its wedge surfaces respectively facing said ledge and end, the end-facing surface of each detent having a relatively gentle slope, whereby a resiliently yieldable spring retainer having a rim of a size to rest on said ledge and between said ledge and said detents may be inserted at said end and readily snapped past said detents and retained between said ledge and said detents, the other face of each detent being relatively abrupt to positively prevent escape of the spring retainer.

6. In a weed spraying cane or the like, a tubular spray body open at both ends and having a bore at one end and a counterbore, a piston comprising a rod reciprocable in and having a foot outside of said end and a head reciprocable in said counterbore, said head having a central hole therethrough, a soft resilient washer clasping said rod above said bore in a manner to prevent passage of liquid therebetween, said rod being telescopically spring-snapped in and firmly interlocked with said head, said body having a valve seat surrounding and spaced from said rod and engageable by said washer at one end of the piston stroke, said body having discharge port means to which liquid from said counterbore is accessible when said washer is unseated and unaccessible when said washer is seated, a spring engaged at one end with said head at the other end of said body, and a perforated spring retainer telescopically spring-snapped in and firmly interlocked with said body adjacent said other end of said body and engaging the other end of said spring and maintaining said spring under compression.

7. A weed spraying cane comprising a tube, a tubular spray body structure for the bottom portion of said tube, a piston guided in said structure and having an end below said structure and a head within said structure, said head being formed to allow restricted flow past said head, said structure having one or more discharge ports controlled by said piston, said structure being telescoped with said tube portion and having an internal annular upwardly facing ledge, said structure having integral detent means over and spaced from said ledge, a perforated spring retainer, said structure and retainer being relatively resiliently yieldable, said retainer having a rim telescoped down in said structure and snapped past said detent means and trapped between said ledge and said detent means, and a spring under compression between said head and said retainer.

8. A weed spraying device comprising a container for weed spraying material, a tubular spray body structure in fixed relation to said container, a piston guided in said structure and having an end below said structure and a head within said structure, said head being formed to allow restricted flow past said head, said structure having one or more discharge ports controlled by said piston, said structure having an upwardly facing ledge and integral detent means over and spaced from said ledge, a spring retainer having a flow passage therethrough, said detent means and retainer being relatively resiliently yieldable, said retainer having a rim telescoped with said structure and snapped past said detent means and trapped between said ledge and said detent means, and a spring under compression between said head and said retainer.

9. In a weed sprayer or the like, a tubular spray body having a bore and a counterbore, a piston comprising a rod reciprocable in said bore and projecting outside of the adjacent end of said body and a head reciprocable in said counterbore and formed to allow restricted flow past said head, said rod being telescopically spring-snapped to and firmly interlocked with said head, a soft resilient washer engaging said piston in a manner to prevent passage of spray material between said piston and said washer, said body having a valve seat engageable by said washer at one end of the piston stroke, said body having a discharge port to which spray material from said counterbore is accessible when said washer is unseated and inaccessible when said washer is seated, and means biasing said head toward said seat.

10. In a weed sprayer or the like, a tubular spray body having a bore and a counterbore, a piston comprising a rod reciprocable in said bore and projecting outside of the adjacent end of said body and a head reciprocable in said counterbore, said rod being telescopically spring-snapped to and firmly interlocked with said head, and a soft resilient washer clasping said rod and engaging said head in a manner to prevent spray fluid from passing through said head at its juncture with said rod, said body having a valve seat engageable by said washer at the discharge end of the piston stroke, said body having a discharge port to which spray fluid from said counterbore is accessible when said washer is unseated and inaccessible when said washer is seated, and means biasing said head toward said seat.

11. In a weed sprayer or the like, a spray body having a cylinder portion to accommodate a piston head, said body also having a neck portion to accommodate a piston rod, a shoulder joining said neck portion to said cylinder portion, said shoulder having a discharge port outside of said neck portion, the radially inner wall of said port being in alignment with the outer surface of said neck portion, whereby the radially inner part of the spray stream is guided by said neck portion.

12. A weed cane spray device comprising an outer elongated tube having in the upper portion thereof a compartment for holding a supply of the material to be sprayed and having in the lower portion thereof a pumping space, discharge orifice means communicating with said pumping space for discharging fluid from the spray device and valve means for dispensing fluid from said compartment to said pumping space, and means in said tube for forcing the fluid in said pumping space under pressure through said discharge orifice means, said discharge orifice means including at least one discharge port defined by outwardly diverging walls providing a downwardly diverging fluid stream.

13. A weed cane spray device comprising an outer elongated tube having in the upper portion thereof a compartment for holding a supply of the material to be sprayed and having in the lower portion thereof a pumping space, discharge orifice means communicating with said pumping space for discharging fluid from the spray device and valve means for dispensing fluid from said compartment to said pumping space, and means in said tube for forcing the fluid in said pumping space under pressure through said discharge orifice means, said discharge orifice means including at least one discharge port defined by radially and circumferentially outwardly diverging walls providing a downwardly diverging fluid stream.

14. In a weed cane spray device comprising an outer elongated tube having in the upper portion thereof a compartment for holding a supply of the material to be sprayed and having in the lower portion thereof a pumping space, discharge orifice means communicating with said pumping space for discharging fluid from the spray device and valve means for dispensing fluid from said compartment to said pumping space, and means in said tube for forcing the fluid in said pumping space under pressure through said discharge orifice means, the improvement comprising: an exposed downwardly axially facing annular wall at the bottom end of said elongated tube, an axially projecting neck portion depending from the central region of said annular wall and having a longitudinal open-ended bore, said valve means having a downwardly spring-urged operating rod which is guidingly supported in said bore and projects down beyond the bottom of said neck portion where it may contact the ground, said rod being raisable relative to said outer tube to open said valve means when the bottom of the rod is placed on the ground and the outer tube is pushed down over the rod, said exposed annular wall having said discharge orifice means formed therein which orifice means includes a number of downwardly directed discharge ports spaced around the base of said neck so that the device will spray fluid on substantially all sides of said neck portion, and each of said ports being defined by downwardly diverging walls providing a downwardly diverging fluid stream.

15. In a weed cane spray device comprising an outer elongated tube having in the upper portion thereof a compartment for holding a supply of the material to be sprayed and having in the lower portion thereof a pumping space, discharge orifice means comunicating with said pumping space for discharging fluid from the spray device and valve means for dispensing fluid from said compartment to said pumping space, and means in said tube for forcing the fluid in said pumping space under pressure through said discharge orifice means, the improvement comprising: an exposed downwardly axially facing annular wall at the bottom end of said elongated tube, an axially projecting neck portion depending from the central region of said annular wall and having a longitudinal open-ended bore, said valve means having a downwardly spring-urged operating rod which is guidingly supported in said bore and projects down beyond the bottom of said neck portion where it may contact the ground, said rod being raisable relative to said outer tube to open said valve means when the bottom of the rod is placed on the ground and the outer tube is pushed down over the rod, said exposed annular wall having said discharge orifice means formed therein which orifice means includes a number of downwardly directed discharge ports spaced around the base of said neck so that the device will spray fluid on substantially all sides of said neck portion, each of said ports being defined by radially and circumferentially downwardly diverging walls providing a downwardly diverging fluid stream, the innermost defining walls of said ports being in alignment with the outer surface of said neck portion, whereby the fluid stream extends contiguous to the bottom of said operating rod.

References Cited in the file of this patent

UNITED STATES PATENTS

| | | |
|---|---|---|
| 235,278 | Norton | Dec. 7, 1880 |
| 1,312,246 | Gehringer | Aug. 5, 1919 |
| 1,772,763 | Van Riper | Aug. 12, 1930 |
| 1,836,259 | Leon | Dec. 15, 1931 |
| 1,960,738 | Giezentanner | May 29, 1934 |
| 2,245,974 | Griswold | June 17, 1941 |
| 2,245,975 | Griswold | June 17, 1941 |
| 2,257,919 | Rutkowski | Oct. 7, 1941 |
| 2,296,500 | Cain | Sept. 22, 1942 |
| 2,366,067 | Smith | Dec. 26, 1944 |
| 2,577,687 | Lee | Dec. 4, 1951 |
| 2,689,068 | Lunn | Sept. 14, 1954 |

FOREIGN PATENTS

| | | |
|---|---|---|
| 1,039,970 | France | May 20, 1953 |